(12) United States Patent
Choi et al.

(10) Patent No.: US 7,206,038 B2
(45) Date of Patent: Apr. 17, 2007

(54) TOUCH SCREEN MOUNTING ASSEMBLY FOR LCD MONITOR

(75) Inventors: Churl Woo Choi, Seoul (KR); Boo Seob Kim, Gyeongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 550 days.

(21) Appl. No.: 10/699,778

(22) Filed: Nov. 4, 2003

(65) Prior Publication Data

US 2004/0160422 A1     Aug. 19, 2004

(30) Foreign Application Priority Data

Nov. 5, 2002 (KR) .................. 10-2002-0068142
Jan. 6, 2003 (KR) .................. 10-2003-0000556

(51) Int. Cl.
*G02F 1/1333* (2006.01)
*G02F 1/1335* (2006.01)

(52) U.S. Cl. .................. 349/58; 349/12; 361/681
(58) Field of Classification Search .................. 349/58, 349/12; 361/681
See application file for complete search history.

(56) References Cited

U.S. PATENT DOCUMENTS 6,685,328 B1 * 2/2004 Hanson et al. ............... 362/610
6,888,591 B2 * 5/2005 Kim ............................. 349/58
6,965,375 B1 * 11/2005 Gettemy et al. ............. 345/173

FOREIGN PATENT DOCUMENTS

| EP | 1269994 | 1/2003 |
| TW | 461686 B1 | 10/2001 |
| TW | 493781 Y | 7/2002 |
| WO | 97041896 | 11/1997 |
| WO | 00072847 | 12/2000 |
| WO | 02074200 | 9/2002 |

OTHER PUBLICATIONS

David G et al., "Intramuscular (IM) ziprasidone 20 mg is effective in reducing acute agitation associated with psychosis: A double-blind, randomized trial" Psychopharmacology vol. 155, No. 2, May 2001.
Yesook Kim et al., "Inclusion complexation of ziprasidone mesylate with β-cyclodextrin sulfobutyl ether" Journal of Pharmaceutical Sciences vol. 87, No. 12, pp. 1560-1567, Dec. 1998.
A. Hatefi and B. Amsden, "Biodegradable injectable in situ forming drug delivery systems" Journal of Controlled Release vol. 80, pp. 9-28, 2002.
Yie W. Chien, "Long-acting parenteral drug formulations" Journal of Parenteral Science & Technology, vol. 35, No. 3, May-Jun. 1981.

* cited by examiner

*Primary Examiner*—Huyen Ngo
(74) *Attorney, Agent, or Firm*—Birch, Stewart, Kolasch & Birch, LLP

(57) ABSTRACT

A touch screen mounting assembly for an LCD monitor is disclosed. The assembly includes a rear cabinet including a pair of fastener supports provided on top and bottom edge portions of the rear cabinet, an LCD module securely fastened within the rear cabinet, a touch screen adhesively attached to the rear cabinet; and a front cabinet including a pair of slip fit fasteners. The slip fit fasteners are able to have slip fit connections with the fastener supports, respectively, for preventing the front cabinet from becoming disengaged from the rear cabinet. Each fastener support includes an extension member extended forward from the rear cabinet, and a recessed channel, where each slip fit fastener includes an extension member extended backward from the front cabinet, and a detent which has slip connection with the recessed channel.

22 Claims, 13 Drawing Sheets

TOUCH SCREEN MOUNTING ASSEMBLY FOR LCD MONITOR

CROSS-REFERENCE TO RELATED APPLICATIONS

This application claims the benefit of Korean Application No. P2002-68142 filed on Nov. 5, 2002 and Korean Application No. P2003-00556 filed on Jan. 6, 2003, which are hereby incorporated by reference as if fully set forth herein.

BACKGROUND OF THE INVENTION

1. Field of the Invention

The present invention relates to an LCD monitor, and more particularly, to a touch screen mounting assembly for an LCD monitor.

2. Discussion of the Related Art

As computer systems have become more advanced, computer monitors are constantly being redesigned to be thinner, lighter, and smarter. One of the most recent technical developments in computer display technology is the touch screen. In general, the touch screen is a device that detects user's touch inputs by fingertips or an object (e.g., stylus for PDAs) and sends the detected information to a data processor, which receives the information and performs the necessary data processing functions.

In general, the existing computer systems having a Liquid Crystal Display (LCD) monitor with a touch screen use three different ways of detecting the user's inputs through the touch screen: pressure detection, heat detection, and light detection methods. In the computer systems employing the heat detection method, when a user touches a portion of the touch screen, the temperature of the touched portion changes. Then a processor detects such temperature variation and performs the necessary data processing functions using the detected information.

A touch screen LCD monitor typically includes a touch screen, font cabinet, adhesive tape, LCD module, and rear cabinet. The touch screen is often attached to the rear side of the font cabinet by the adhesive tape, and the LCD module is fastened to the front surface of the rear cabinet. Then the front cabinet and the rear cabinet are joined together by screwing the edge portions the rear cabinet into the corresponding portion of the front cabinet. However, when the LCD monitor having such structure is on severe impact or used for a long period of time, the touch screen is often loosened and dislocated within the monitor. Therefore, more secure attachment between the front and rear cabinets is required.

In addition, if the front cabinet has one or more defects, then it is extremely difficult to replace the front cabinet because it is adhesively attached to the touch screen. Removing the front cabinet from the rear cabinet may cause the touch screen to be greatly damaged. Therefore, it is desirable to have a touch screen LCD monitor, in which a touch screen is secured within the monitor without any adhesive attachment with the front cabinet.

SUMMARY OF THE INVENTION

Accordingly, the present invention is directed to a touch screen mounting assembly that substantially obviates one or more problems due to limitations and disadvantages of the related art.

An object of the present invention is to provide a touch screen mounting assembly for an LCD monitor, in which a touch screen is tightly mounted and is properly located within the LCD monitor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a first example of a touch screen mounting assembly according to the present invention may include a rear assembly, an LCD module secured within the rear cabinet, a touch screen adhesively attached to the rear cabinet, and a front cabinet. The rear cabinet may include a pair of fastener supports provided on top and bottom edge portions of the rear cabinet. On the other hand, the front cabinet may include a pair of slip fit fasteners, which may have slip fit connections with the pair of fastener supports, respectively, for preventing the front cabinet from becoming disengaged from the rear cabinet. Each fastener support may include a first extension member extended forward from the corresponding edge portion of the rear cabinet, and a recessed channel provided on a surface of the first extension member. In addition, each slip fit fastener may include a second extension member extended backward from the corresponding edge portion of the front cabinet, and a detent, which may have a slip fit connection with the recessed channel.

In another aspect of the present invention, a second example of the touch screen mounting assembly according to the present invention may include a hollow bracket including a plurality of mounting portions, a touch screen adhesively attached for a front side of the hollow bracket, an LCD module adhesively attached to a rear side of the hollow bracket, and a front cabinet including a plurality of hollow bosses. The mounting portions of the hollow bracket are adapted to receive a plurality of fasteners (e.g., screws) for being fastened to the corresponding bosses, and they may be provided on top and bottom edge portions of the hollow bracket. The hollow bracket may further include a plurality of slits, and front cabinet may further include a plurality of support plates fitted in the corresponding slits respectively for more tightly securing the hollow bracket within the front cabinet.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
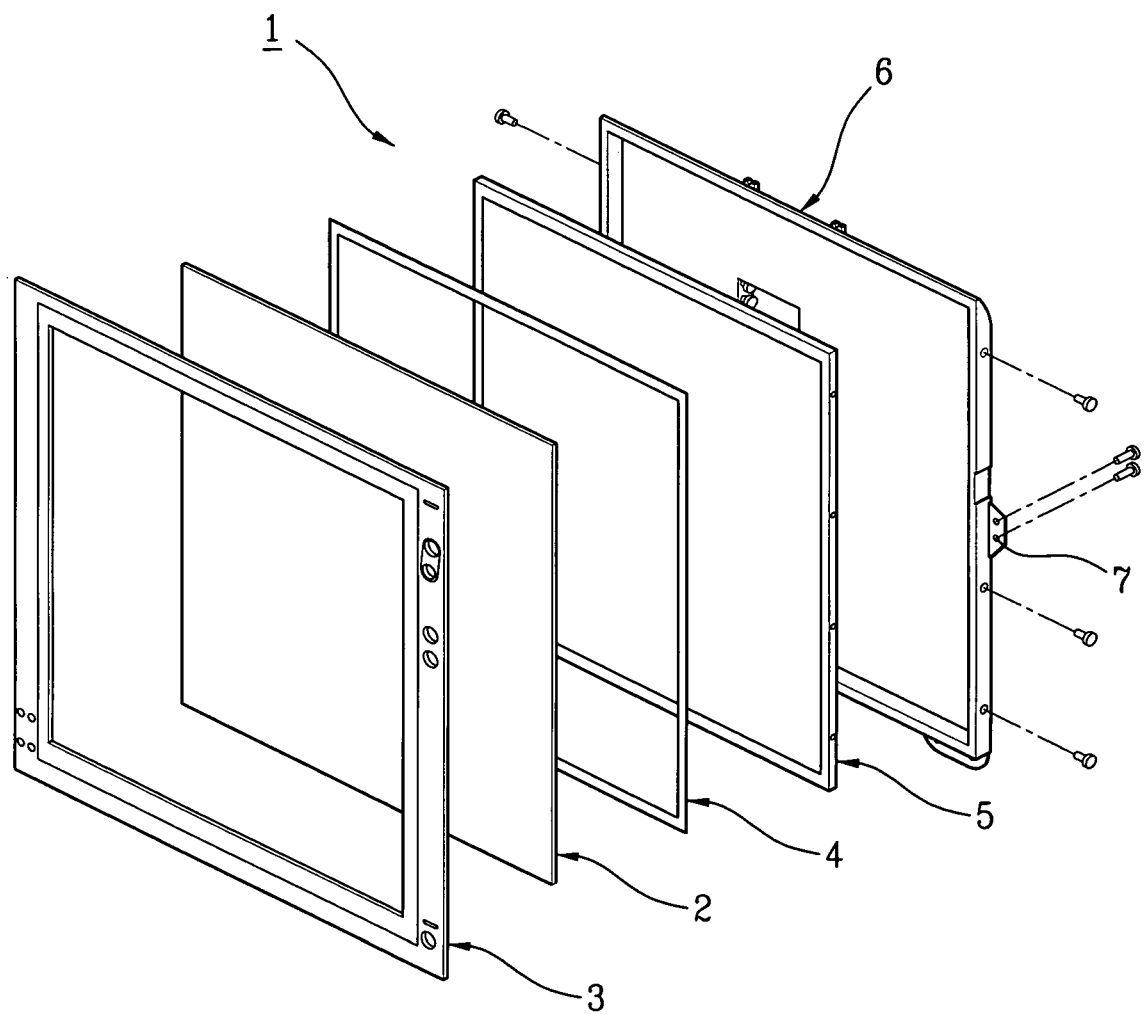
FIG. 1 illustrates an exploded view of a first example of a touch screen mounting assembly according to the present invention.
Figure 5:
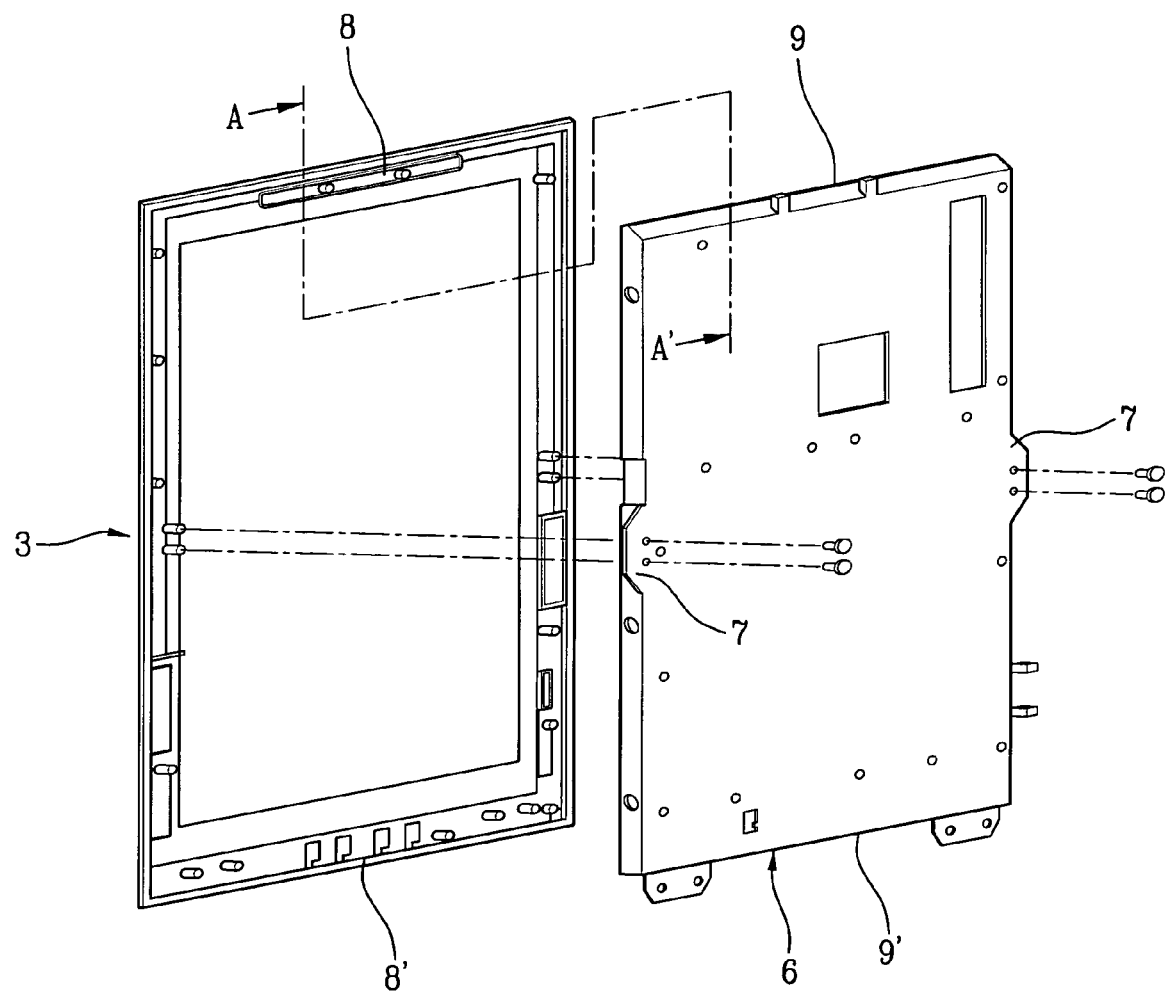

FIG. 1 illustrates an exploded view of a first example of a touch screen mounting assembly 1 for a liquid crystal display (LCD) monitor according to the present invention. The touch screen mounting assembly 1 shown in FIG. 1 includes a touch screen 2, a front cabinet 3, a double-sided adhesive tape 4, an LCD module 5, and a rear cabinet 6. Referring to FIG. 5, which illustrates the front cabinet 3 and the rear cabinet 6 in more detail, the rear cabinet 6 includes a pair of fastener supports 9 and 9', which are provided on the top and bottom edge portions of the rear cabinet 6, respectively. The front cabinet 3 also includes a pair of slip fit fasteners 8 and 8', which are provided on the top and bottom edge portions of the front cabinet 3, respectively. The front cabinet 3 may be securely fastened to the rear cabinet 6 by directly securing the slip fit fasteners 8 and 8' into the fastener supports 9 and 9', respectively. The pair of slip fit fasteners 8 and 8' have slip fit connections with the pair of fastener supports 9 and 9', respectively, for preventing the front cabinet 3 from becoming disengaged from the rear cabinet 6. In addition, the rear cabinet 6 may further include a coupling portion 7, which is provided at the left and right edge portions of the rear cabinet 6. Each coupling portion 7 has a plurality of fastening holes (e.g., screw holes) adapted to receive a plurality of fasteners (e.g., screws) for securing the coupling portions 7 of the rear cabinet 6 to the corresponding portions of the front cabinet 3.

Figure 6:
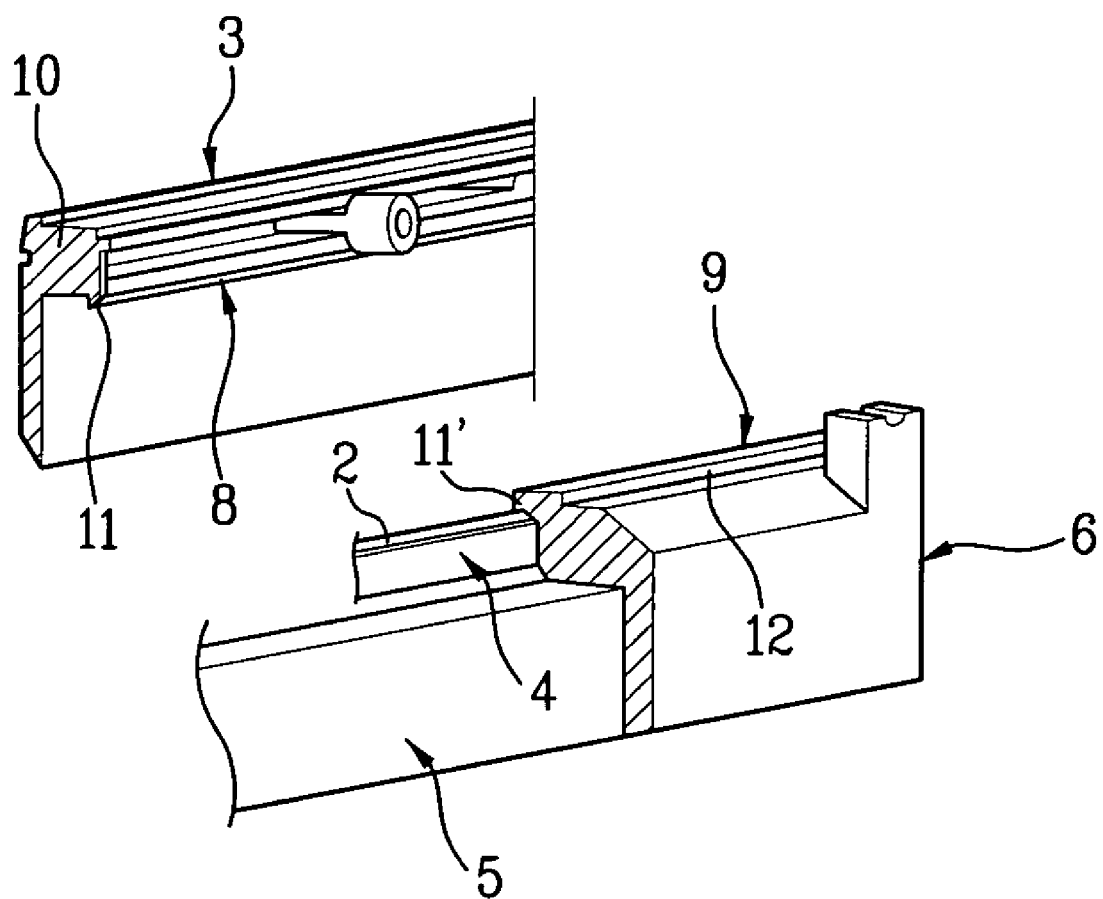
FIG. 6 illustrates the top slip fit fastener 8 and the top fastener support 9 shown in FIG. 5 in more detail.

FIG. 6 illustrates the top slip fit fastener 8 and the top fastener support 9 shown in FIG. 5 in more detail. According to FIG. 6, the top fastener support 9 includes an extension member 11' extended forward (toward the front cabinet 3) from the top edge portion of the rear cabinet 6. The top fastener support 9 further includes a recessed channel 12, which is provided on a top surface of the extension member 11'. On the other hand, the top slip fastener 8 includes an extension member 10 and a detent 11 provided at the end of the extension 10. The extension member 10 is extended backward (toward the rear cabinet 6) from the top edge portion of the front cabinet 3, and the detent 11 is extended downward from the end of the extension 10. The detent is able to have a slip fit connection with the recessed channel 12 of the top fastener support 9. It is slidable on the surface of the extension member 11' and is engageable with the recessed channel 12 to assure attention of the top portion of the front cabinet 3 on the corresponding portion of the rear cabinet 6. In order to achieve smooth slip fit connection, at least one of the top slip fit fastener 8 and the top fastener support 9 may be made of an elastic material (e.g., flexible plastic or rubber material). In addition, the rear cabinet 6 may be made of a plastic material so that it could be easily shaped or formed.

The bottom slip fit fastener 8' and the bottom fastener support 9' of FIG. 5 (not illustrated in FIG. 6) may be symmetrical to the top slip fit fastener 8 and the top fastener support 9 shown in FIG. 6. For example, the bottom fastener support 9' may include an extension member extended forward (toward the front cabinet 3) from the bottom edge portion of the rear cabinet 6, and a recessed channel provided on a bottom surface of the extension member. In addition, the bottom slip fastener 8' may include an extension member extended backward (toward the rear cabinet 6) from the bottom edge portion of the front cabinet 3, and a detent extended upward from the end of the extension. Similarly, the detent of the bottom slip fit fastener 8' is able to have a slip fit connection with the recessed channel of the bottom fastener support 9' to prevent the lower portion of the front cabinet 3 from becoming disengaged from the rear cabinet 6. At least one of the bottom slip fit fastener 8' and the bottom fastener support 9' may be made of an elastic material to achieve smooth slip fit connection.

Figure 2:
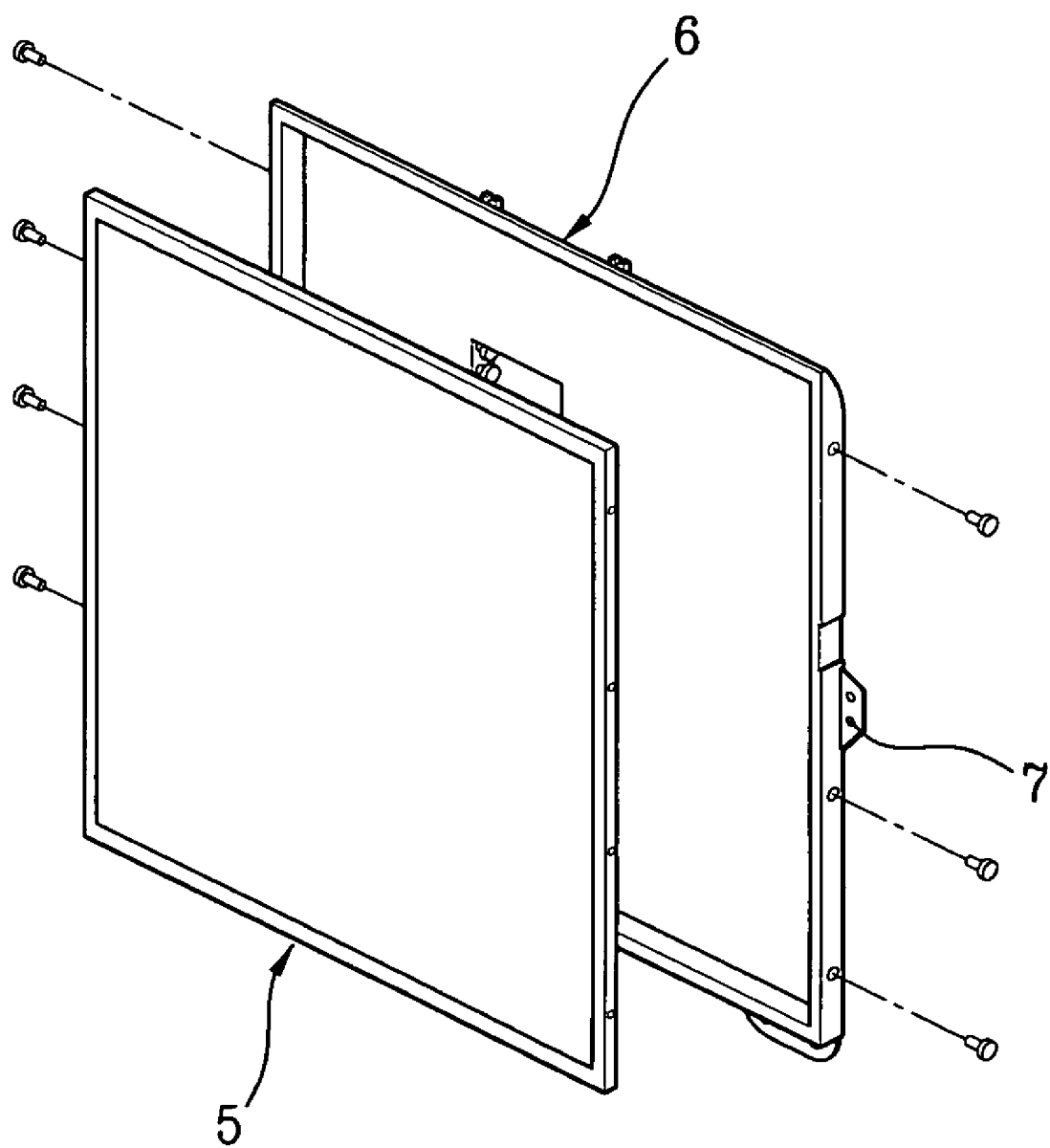
FIG. 2 illustrates how the LCD module 5 is secured within the rear cabinet 6 shown in FIG. 1.

Reference will now be made in detail to how the touch screen mounting assembly shown in FIG. 1 is assembled, examples of which are illustrated in FIG. 2 to FIG. 6. First of all, FIG. 2 illustrates how the LCD module 5 is secured within the rear cabinet 6. Referring to FIG. 2, a space surrounded by left, right, top and bottom side-walls of the rear cabinet 6 is provided within the rear cabinet 6 for accommodating the LCD module 5. The rear cabinet 6 includes a plurality of fastening holes (evenly or unevenly spaced) adapted to receive a plurality of fasteners (e.g., screws) for securing the LCD module 5 to the rear cabinet 6. The plurality of fastening holes may be provided on the left and right side-walls of the rear cabinet 6. The LCD module 5 may be initially inserted into and be stably placed within the space of the rear cabinet 6. Then it may be securely fastened to the rear cabinet 6 by securely tightening the plurality of fasteners through the fastening holes of the rear cabinet 6.

Figure 3:
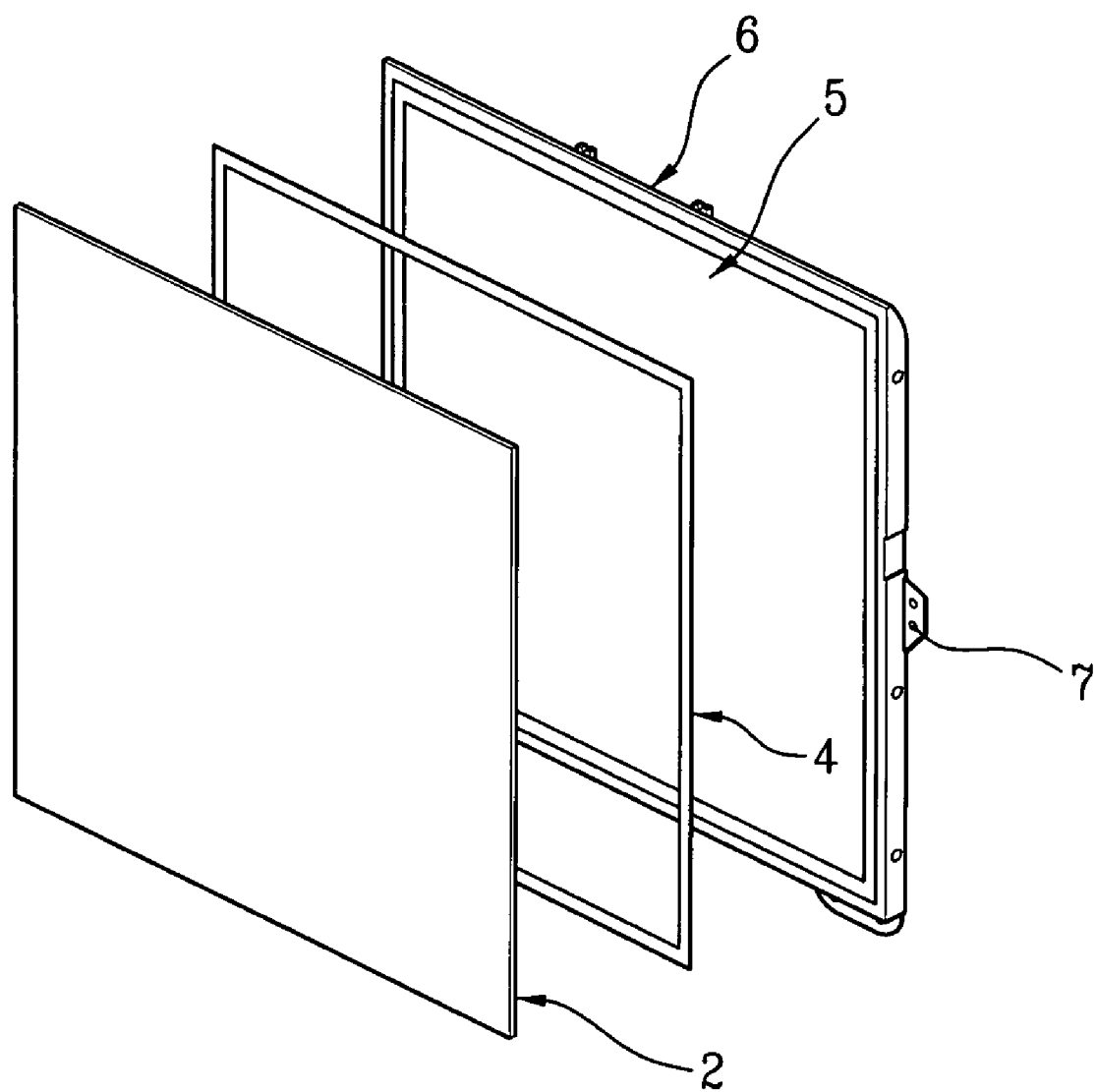
FIG. 3 illustrates how the touch screen 2 is secured to the rear cabinet 6, after the LCD module 5 is secured.

Next, FIG. 3 illustrates how the touch screen 2 is adhesively attached to the rear cabinet 6 after the LCD module 5 is secured within the rear cabinet 6. The rear cabinet 6 includes a circumferential ridge provided on the edge portion of the rear cabinet 6 for accommodating the double-sided adhesive tape 4. After one side of the adhesive tape 4 is adhesively attached to the ridge of the rear cabinet 6, the rear surface edge portion of the touch screen 2 is adhesively attached to the other side of the adhesive tape 4.

Figure 4:
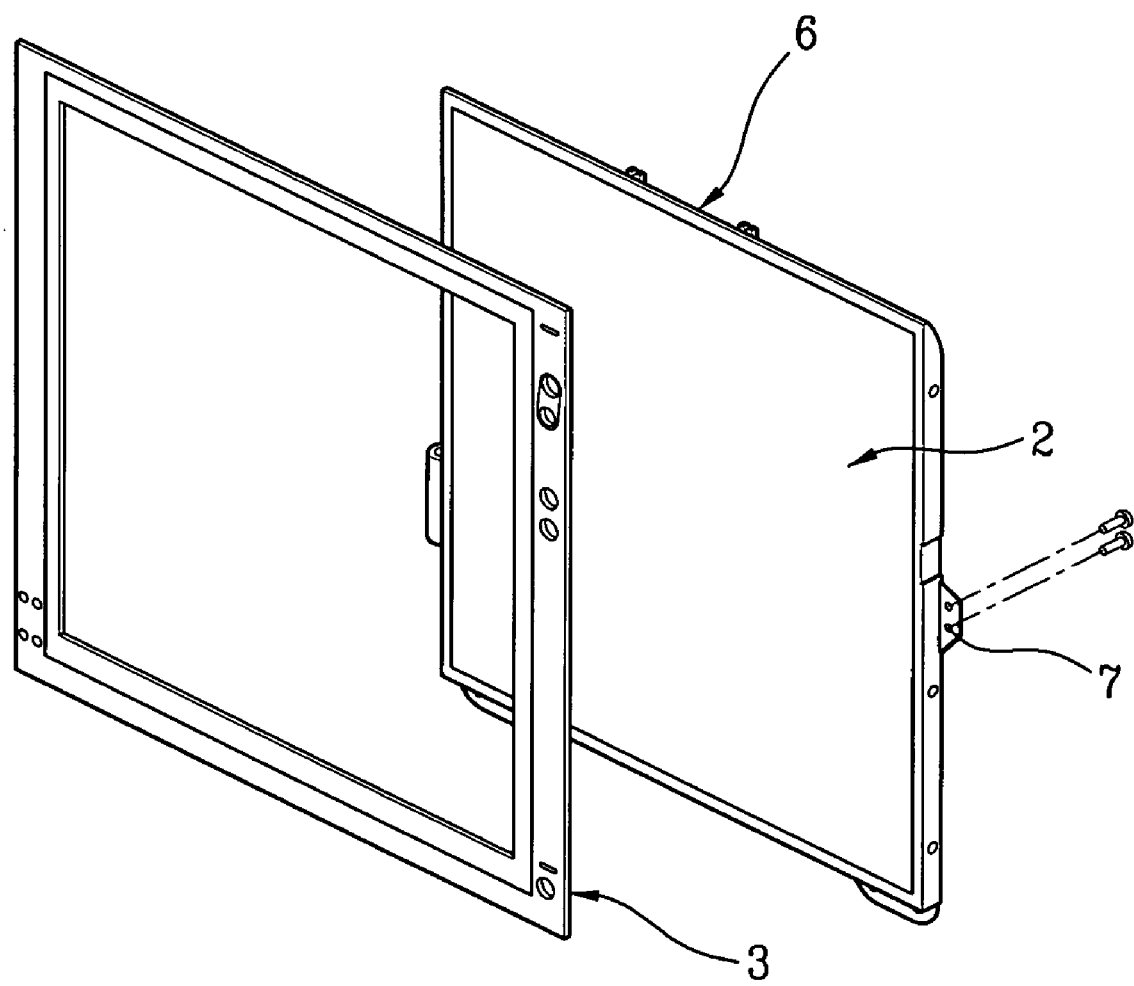
FIG. 4 and FIG. 5 are respective front and rear views illustrating how the front cabinet 3 is secured to the rear cabinet 6 after the touch screen 2 is secured.

FIG. 4 and FIG. 5 are front and rear views illustrating how the front cabinet 3 is fastened to the rear cabinet 6 after the touch screen 3 is attached to the rear cabinet 6. Initially, the front cabinet 3 may be tilted with respect to the rear cabinet 6, and the top slip fit fastener 8 may be engaged with the top fastener support 9 of the rear cabinet 6 by moving the top slip fit fastener 8 downward. Next, the bottom slip fit fastener 8' may be elastically engaged (slip fit connection) with the bottom faster support 9' of the rear cabinet 6 by pressing the bottom part of the front cabinet 3 against the rear cabinet 6.

More specifically, the top detent 11 of the front cabinet 3 shown in FIG. 6 may be initially inserted into the top recessed channel 12 of the rear cabinet 6. Next, when the bottom part of the front cabinet 8 is pressed against the rear cabinet 6, the bottom detent (not illustrated) of the front cabinet 3 slides over the bottom surface of the bottom fastener support 9'. When the bottom part of the front cabinet 8 is further pressed, the bottom detent finally engages with the bottom recessed channel (not illustrated) to prevent the bottom fastener support 9' from becoming disengaged from the bottom slip fit fastener 8'. The order of the engagements between the slip fit fasteners 8 and 8' and the fastener supports 9 and 9' are not important. For example, the detent of the bottom slip fit fastener 8' may be initially inserted into the bottom recessed channel, and the top portion of the front cabinet 8 may be pressed against the rear cabinet 6 so that the top detent 11 engages with the top recessed channel 12 to prevent the top fastener support 9 from becoming disengaged from the top slip fastener 8. In addition, the engagements between the slip fit fasteners 8 and 8' and the fastener supports 9 and 9' can be done at same time. When the top and bottom parts of the front cabinet 3 are pressed against the rear cabinet 6, both detents may slide over the surfaces of the fastener supports 9 and 9', respectively, and may engage with the corresponding recessed channels.

Referring back to FIG. 5, after the top and bottom slip fit fasteners 8 and 8' are properly engaged with the corresponding fastener supports 9 and 9', the front cabinet 8 is further fastened to the rear cabinet 6 by a plurality of fasteners (e.g., screws). Each coupling portion 7 provided on the left and right edge portions of the rear cabinet 6 has a plurality of screw holes adapted to receive the plurality of fasteners for further securely fastening the rear cabinet 6 directly to the front cabinet 3.

As described above, the front cabinet 3 is securely fastened to the rear cabinet 6 by initially securing the top and bottom slip fit fasteners 8 and 8' to the top and bottom fastener supports 9 and 9', respectively, and by screwing the coupling portions 7 of the rear cabinet 6 into the corresponding portions of front cabinet 3. Since all the edge portions (top, bottom, left and right) of the front and rear cabinets are tightly secured together, the touch screen 2 provided within the touch screen assembly 1 may not be loosened or dislocated even if the assembly 1 is on severe impact or used for a long period of time.

Figure 7A:
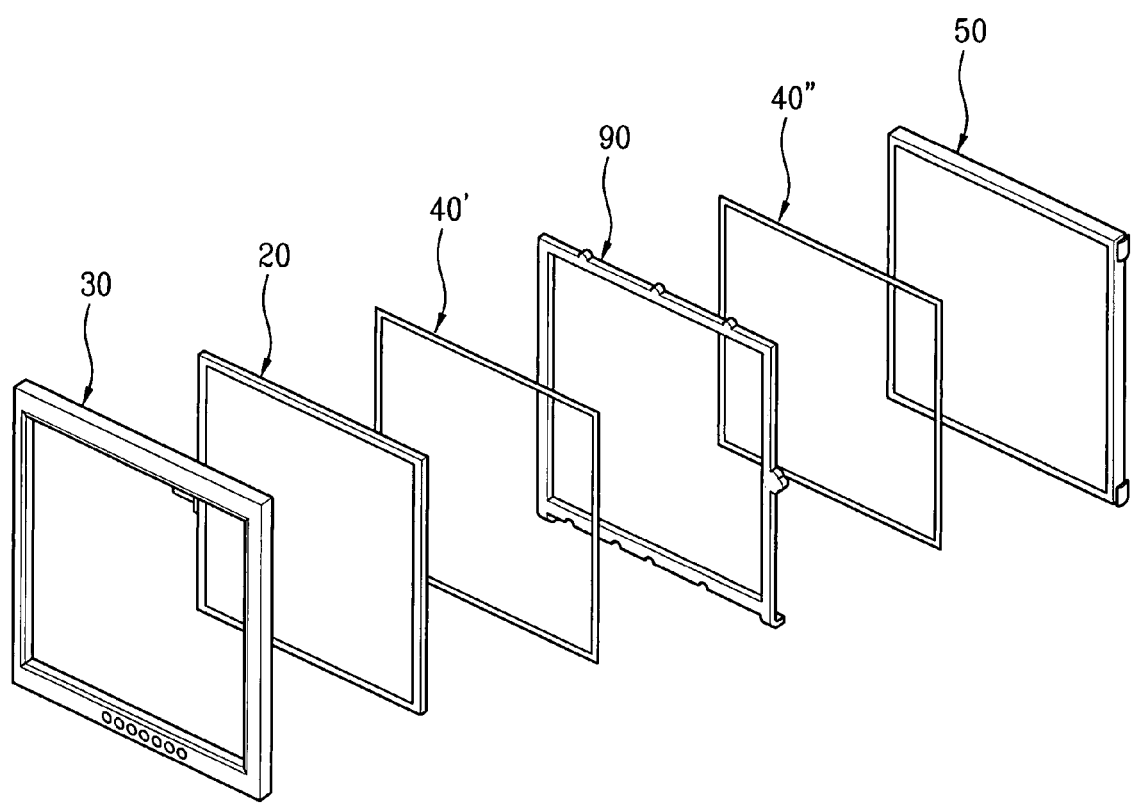
FIGS. 7A and 7B illustrate front and rear exploded views of a second example of a touch screen mounting assembly according to the present invention.
Figure 7B:
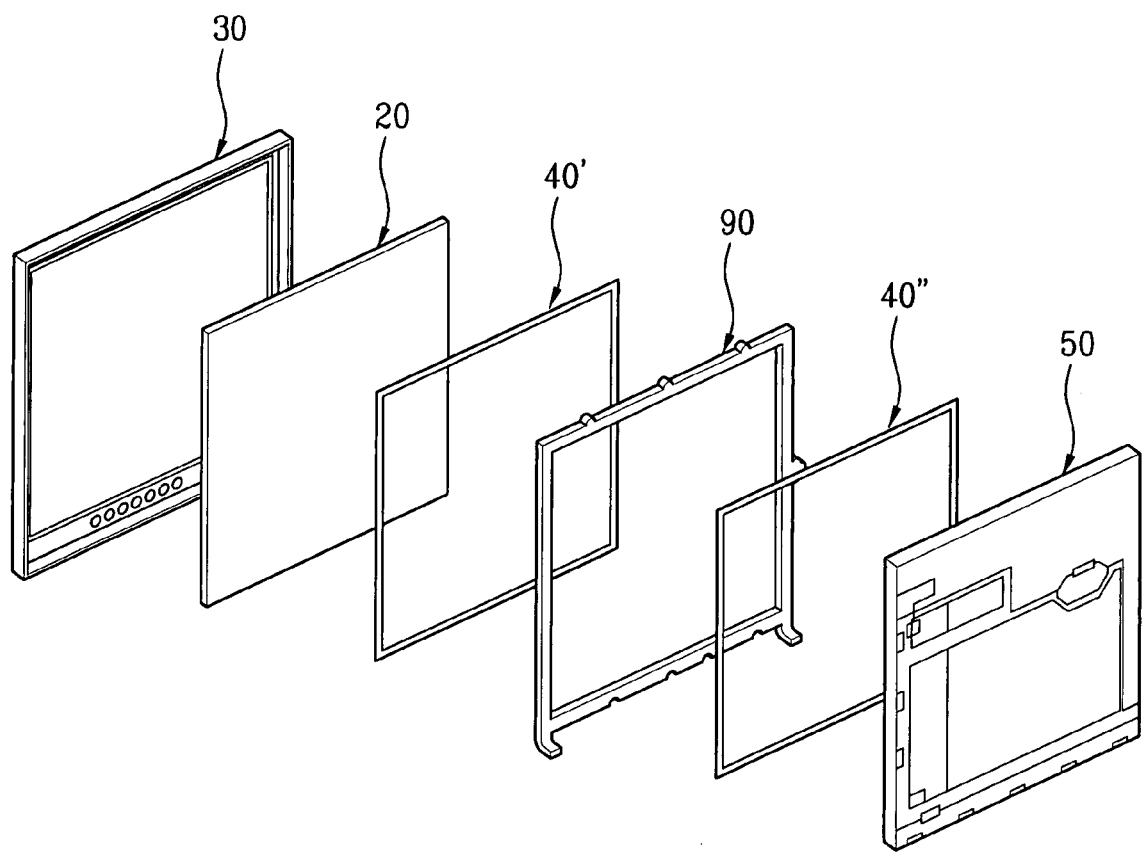

FIGS. 7A and 7B illustrate front and rear exploded views of a second example of a touch screen mounting assembly for a liquid crystal display (LCD) monitor according to the present invention. The touch screen assembly includes a touch screen 20, a front cabinet 30, a first double-sided adhesive tape 40', a second double-sided adhesive tape 40", an LCD module 50, and a hollow bracket 90. A front ridge and a rear ridge are provided on the front and rear sides of the hollow bracket 90 for accommodating the first and the second adhesive tapes 40' and 40", respectively. Then the touch screen 20 may be adhesively attached to the hollow bracket 90 by attaching one side of the first adhesive tape 40' to the front ridge and by attaching the other side to the rear side edge portion of the touch screen 20. Similarly, the LCD module 50 may be adhesively attached to the hollow bracket 90 by attaching one side of the second tape 40" to the rear ridge and by attaching the other side to the front side edge portion of the LCD module 50.

Figure 9A:
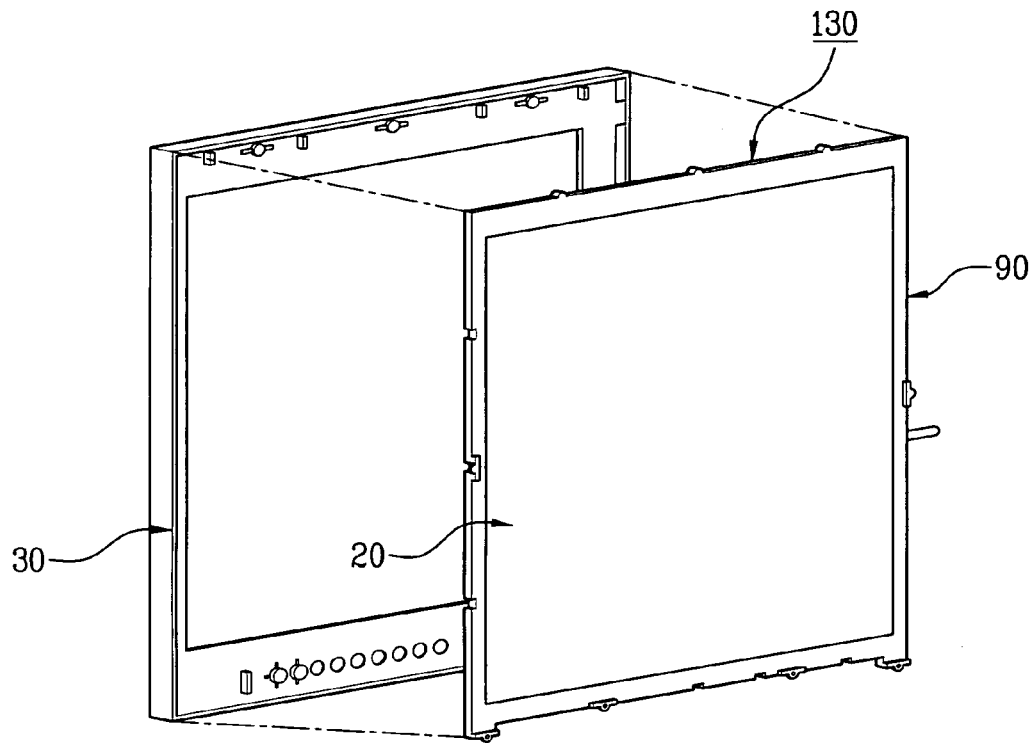
FIGS. 9A and 9B illustrate how the bracket assembly 130 shown in FIG. 8 is securely fastened within the front cabinet 30.
Figure 9B:
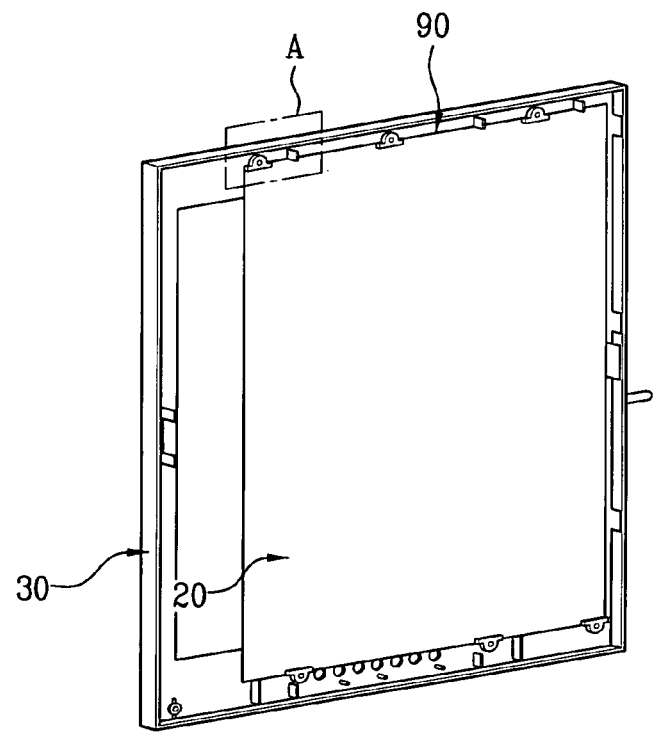
Figure 9C:
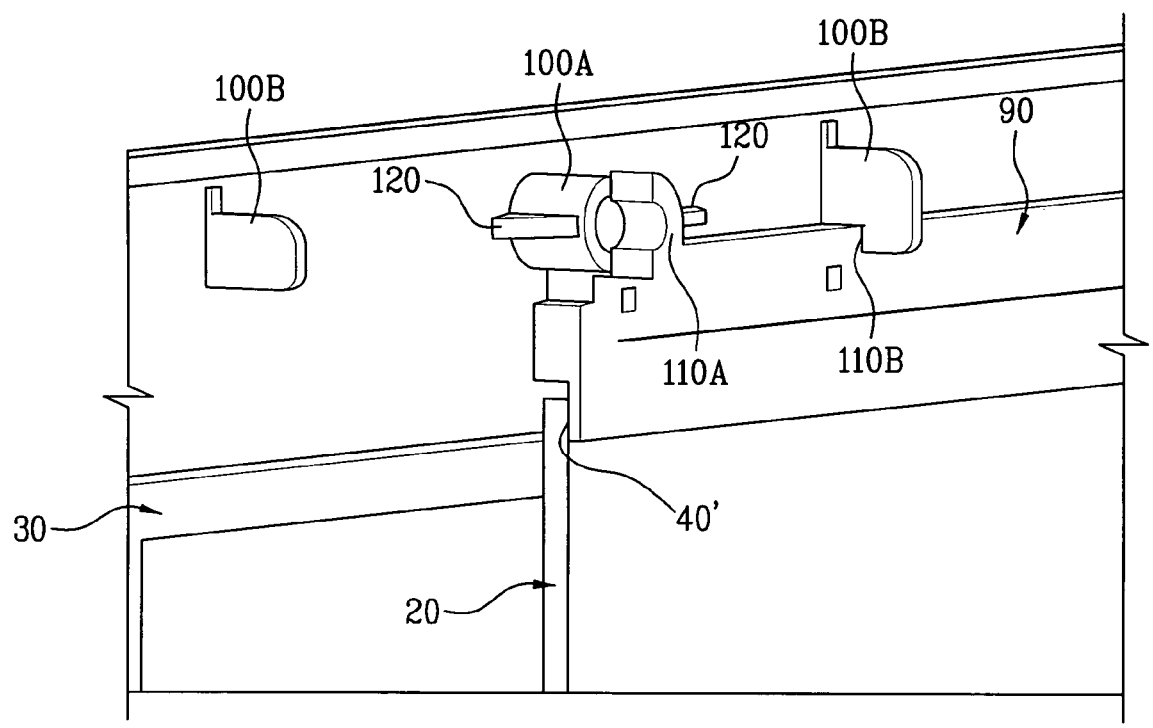
FIG. 9C illustrates a magnified view of the attachment (area A) between the front cabinet 30 and the bracket assembly 130 shown in FIG. 9B.

Referring to FIGS. 9B and 9C illustrating the attachment between the front cabinet 30 and the hollow bracket 90, the hollow bracket 90 includes a plurality of cylindrical mounting portions 110A, each of which has a through hole, and a plurality of slits 110B. The mounting portions 110A and the slits 110B may be provided on the top and bottom (or left and right) edge portions of the bracket 90. On the other hand, the front cabinet 30 includes a plurality of hollow bosses 100A and a plurality of support plates 100B on the corresponding portions of the front cabinet 30. The mounting portions 110A of the bracket 90 are adapted to receive a plurality of fasteners (e.g., screws) for being securely fastened to the corresponding hollow bosses 100A of the front cabinet 30, respectively. The inner surface of each boss 100A is threaded so as to receive a corresponding screw-type fastener, and at least one supplementary rib 12 is provided around the boss 100A so that the boss 100A is stably supported. In addition, the support plates 100B of the front cabinet 30 may be fitted in the corresponding slits 110B of the hollow bracket 90, respectively for further securing the hollow bracket 90 within the front cabinet 30.

Figure 11:
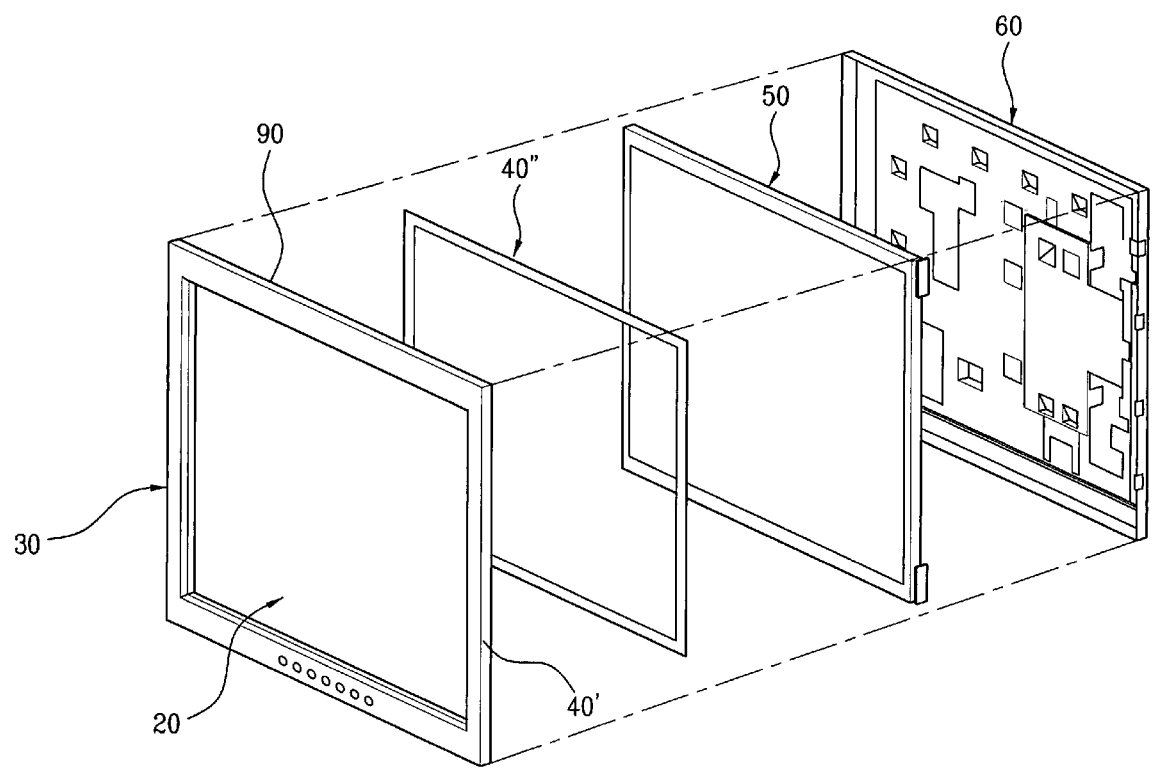
FIG. 11 illustrates how the rear cabinet 60 is securely fastened to the front cabinet 30 after the LCD module 50 is secured as shown in FIG. 10.

The rear cabinet 60 shown in FIG. 11 may include a plurality of fastening holes (not illustrated) adapted to receive a plurality of fasteners (e.g., screws) for being securely fastened to the front cabinet 30. The plurality of fastening holes may be provided at the left and right (or top and bottom) edge portions of the rear cabinet 60. The rear cabinet 60 may further include a rectangular space surrounded by side-walls of the rear cabinet 60 for accommodating the LCD module 50.

Figure 8:
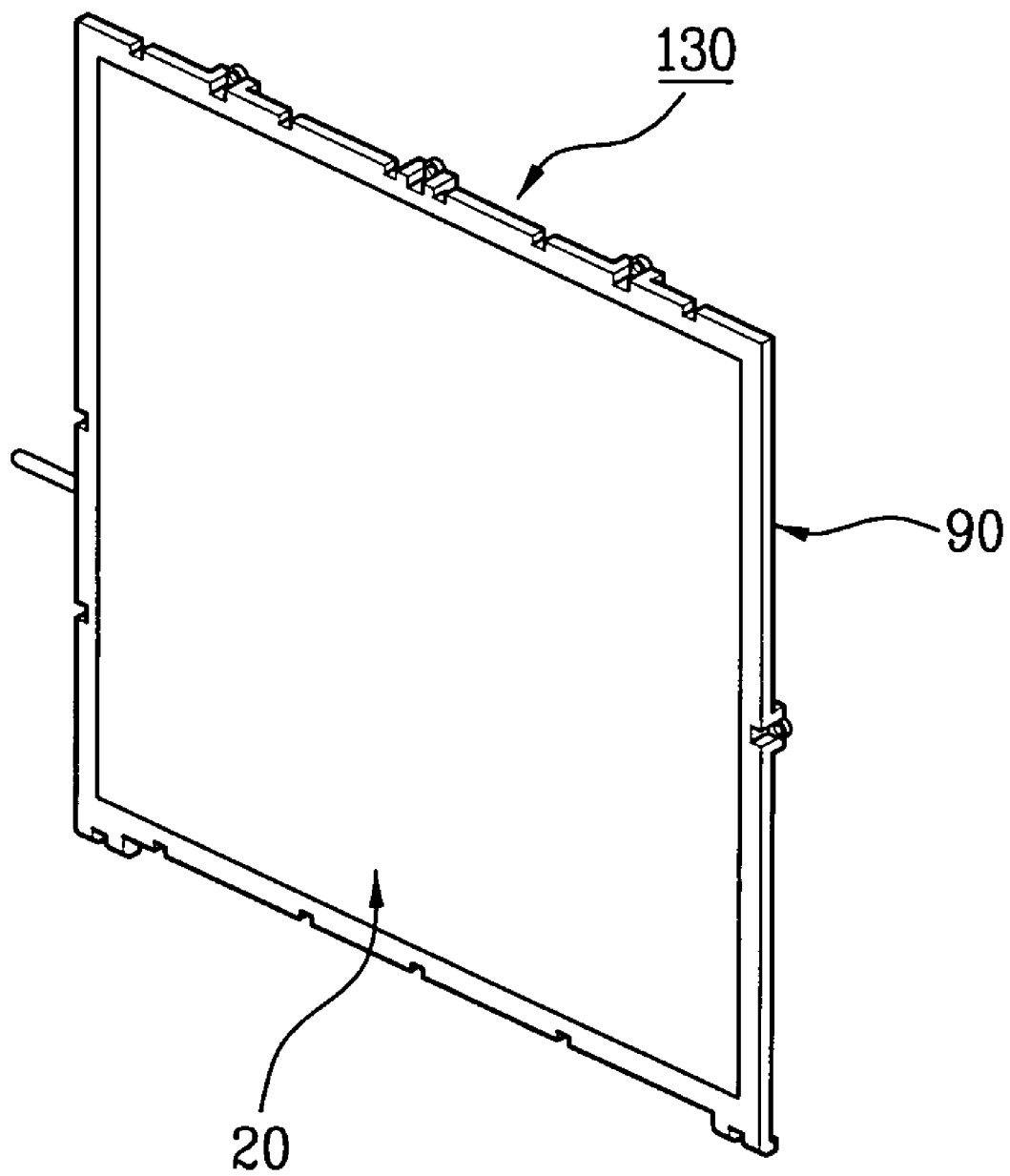
FIG. 8 illustrates a front view of a bracket assembly 130 which includes the hollow bracket 90 and the touch screen 20 shown in FIGS. 7A and 7B.

Reference will now be made in detail to how the touch screen mounting assembly shown in FIGS. 7A and 7B is assembled. Initially, the touch screen 20 shown in FIG. 7A may be adhesively secured within the hollow bracket 90. This may be done by attaching one side of the first double-sided adhesive tape 40' to the rear side edge portion of the touch screen 20 and by attaching the other side of the tape 40' to the front ridge, which is provided on the front side of the hollow bracket 90. FIG. 8 illustrates a front view of a bracket assembly 130 that includes the hollow bracket 90 and the touch screen 20 adhesively secured together as described above.

Next, FIG. 9A and FIG. 9B illustrate how the bracket assembly 130 shown in FIG. 8 is secured within the front cabinet 30, and FIG. 9C illustrates a magnified view of the attachment (area A shown in FIG. 9B) between the front cabinet 30 and the bracket assembly 130. According to FIGS. 9B and 9C, the plurality of support plates 100B are provided on the top and bottom edge portions of the front cabinet 30, and the plurality of slits are 110B are provided on the top and bottom edge portions of the hollow bracket 90. The plurality of support plates 100B are fitted in the corresponding slits 110B of the bracket 90 so as to prevent the bracket assembly 130 from moving in a direction parallel to the front cabinet 30. In addition, the plurality of cylindrical mounting portions 110A are spaced such that they are aligned with the corresponding hollow bosses 100A (inner surface threaded) of the front cabinet 30 side by side, respectively, when the plurality of support plates 100B are fitted in the corresponding slits 110B. The mounting portions 110A, each of which has a through hole, are adapted to receive a plurality of fasteners (e.g., screws) for being secured to the corresponding bosses 100A so that the bracket assembly 130 is secured within the front cabinet 30. When the plurality of mounting portions 110A are properly secured to the corresponding hollow bosses 100A, the motion of the bracket assembly 130 with respect to the front cabinet 30 is completely locked.

Figure 10:
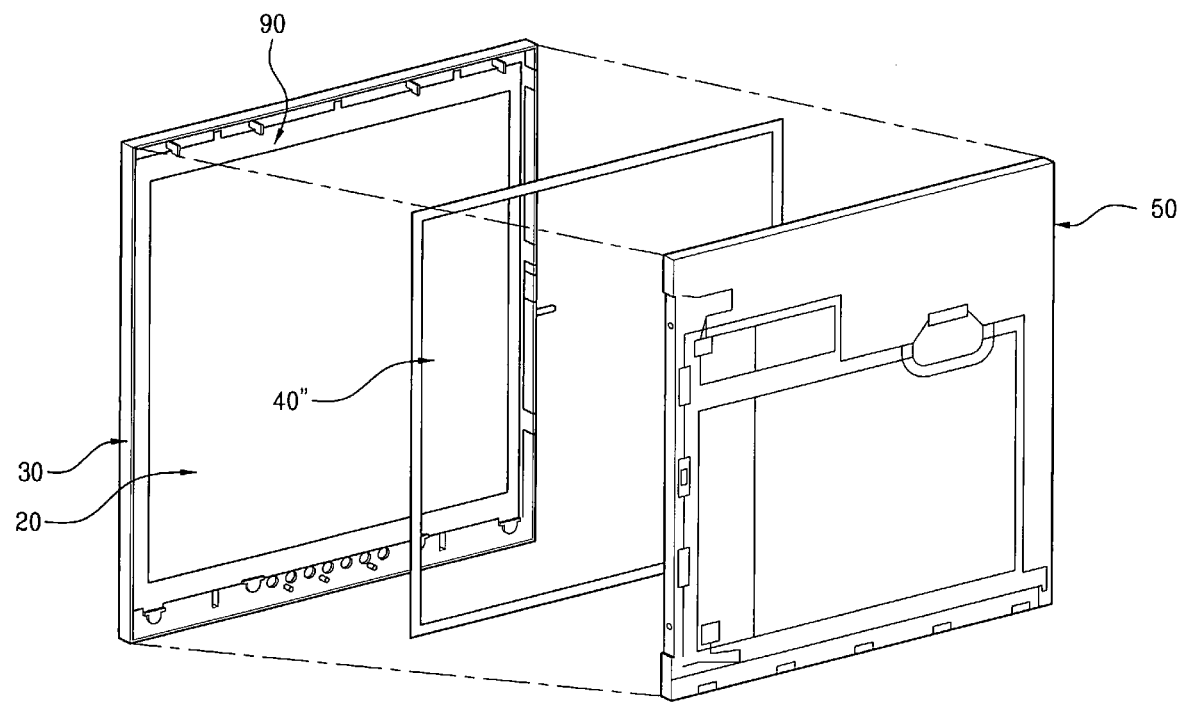
FIG. 10 illustrates how the LCD module 50 is securely fastened to the hollow bracket 90.

FIG. 10 illustrates how the LCD module 50 is securely fastened to the hollow bracket 90. According to FIG. 10, the LCD module 50 is adhesively attached to the rear side of the hollow bracket 90. In other words, one side of the second double-sided adhesive tape 40" is attached to the rear ridge provided on the rear side of the hollow bracket 90, and the other side of the tape 40" is attached to the front side edge portion of the LCD module 50.

Finally, FIG. 11 illustrates how the rear cabinet 60 is securely fastened to the front cabinet 30 after the LCD module 50 is secured as shown in FIG. 10. Referring to FIG. 11, a space is provided within the rear cabinet 60 for accommodating the LCD module 50. Each coupling portion (not illustrated) provided on left and right edge portions of the rear cabinet 60 has a plurality of holes adapted to receive a plurality of fasteners (e.g., screws) for securely securing the edge portions of the rear cabinet 60 directly to the corresponding portions of the front cabinet 30.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch screen mounting assembly for a liquid crystal display (LCD) monitor, the assembly comprising:
   a rear cabinet including a pair of fastener supports provided on top and bottom edge portions of the rear cabinet;
   an LCD module securely fastened within the rear cabinet;
   a touch screen adhesively attached to the rear cabinet; and
   a front cabinet including a pair of slip fit fasteners provided on top and bottom edge portions of the front cabinet, wherein the pair of slip fit fasteners have slip fit connections with the pair of fastener supports, respectively, for preventing the front cabinet from becoming disengaged from the rear cabinet.

2. The touch screen mounting assembly of claim 1, wherein each fastener support comprises:
   a first extension member extended forward from the corresponding edge portion of the rear cabinet; and
   a recessed channel provided on a surface of the first extension member.

3. The touch screen mounting assembly of claim 2, wherein each slip fit fastener comprises:
   a second extension member extended backward from the corresponding edge portion of the front cabinet; and
   a detent provided at an end of the second extension member, the detent being able to have a slip fit connection with the recessed channel.

4. The touch screen mounting assembly of claim 3, wherein the detent is slidable on the surface of the first extension member and is engageable with the recessed channel to assure retention of the front cabinet on the rear cabinet.

5. The touch screen mounting assembly of claim 3, wherein at least one of the first and second extension members is flexible and made of an elastic material.

6. The touch screen mounting assembly of claim 1, wherein the rear cabinet further includes a space for accommodating the LCD module, the space being surrounded by sidewalls of the rear cabinet.

7. The touch screen mounting assembly of claim 6, wherein the rear cabinet further includes a plurality of fastening holes adapted to receive a plurality of fasteners for securing the LCD module within the rear cabinet.

8. The touch screen mounting assembly of claim 1, wherein the rear cabinet further includes a circumferential ridge for accommodating a double-sided adhesive tape to adhesively attach the touch screen to the rear cabinet.

9. The touch screen mounting assembly of claim 8, wherein the touch screen is adhesively attached to the rear cabinet by attaching a first side of the adhesive tape to the circumferential ridge and attaching the touch screen to a second side of the adhesive tape.

10. The touch screen mounting assembly of claim 1, wherein at least one of the pair of fastener supports is made of an elastic material.

11. The touch screen mounting assembly of claim 1, wherein the rear cabinet further includes a plurality of fastening holes adapted to receive a plurality of fasteners for securing the front cabinet to the rear cabinet.

12. The touch screen mounting assembly of claim 11, wherein the plurality of fastening holes are provided at left and right edge portions of the rear cabinet, respectively.

13. A touch screen mounting assembly for a liquid critical display (LCD) monitor, the assembly comprising:
    a hollow bracket including a plurality of mounting portions, each mounting portion having a through hole;
    a touch screen adhesively attached to a front side of the hollow bracket;
    an LCD module adhesively attached to a rear side of the hollow bracket; and
    a front cabinet including a plurality of hollow bosses, wherein the plurality of mounting portions are adapted to receive a first plurality of fasteners for being fastened to the plurality of bosses, respectively.

14. The touch screen mounting assembly of claim 13, wherein inner surfaces of the plurality of hollow bosses are threaded so as to receive the plurality of fasteners, respectively.

15. The touch screen mounting assembly of claim 13, wherein the front cabinet further includes at least one supplementary rib provided around each hollow boss for supporting the each hollow boss.

16. The touch screen mounting assembly of claim 13, wherein the hollow bracket further includes a plurality of slits, and the front cabinet further includes a plurality of support plates fitted in the plurality of slits, respectively, for further securing the hollow bracket within the front cabinet.

17. The touch screen mounting assembly of claim 13, wherein the plurality of mounting portions are provided on top and bottom edge portions of the hollow bracket and the plurality of hollow bosses are provided on the corresponding edge portions of the front cabinet.

18. The touch screen mounting assembly of claim 13, wherein a front ridge is provided on the front side of the hollow bracket for accommodating a double-sided adhesive tape to adhesively attach the touch screen to the hollow bracket.

19. The touch screen mounting assembly of claim 13, wherein a rear ridge is provided on the rear side of the hollow bracket for accommodating a double-sided adhesive tape to adhesively attach the LCD module to the hollow bracket.

20. The touch screen mounting assembly of claim 13, further comprising a rear cabinet that includes a plurality of fastening holes adapted to receive a second plurality of fasteners for being securely fastened to the front cabinet.

21. The touch screen mounting assembly of claim 20, wherein the plurality of fastening holes are provided at left and right edge portions of the rear cabinet, respectively.

22. The touch screen mounting assembly of claim 20, wherein the rear cabinet further includes a space for accommodating the LCD module, the space being surrounded by sidewalls of the rear cabinet.

* * * * *